(12) United States Patent
Hung

(10) Patent No.: US 6,423,450 B1
(45) Date of Patent: Jul. 23, 2002

(54) ELECTRICITY STORAGE DEVICE

(76) Inventor: Chin-Lien Hung, No. 21, Lane 151, Ho-Tso Street, Feng-Yuan City, Taichung Hsien (TW)

( * ) Notice: Subject to any disclaimer, the term of this patent is extended or adjusted under 35 U.S.C. 154(b) by 91 days.

(21) Appl. No.: 09/603,770

(22) Filed: Jun. 26, 2000

(51) Int. Cl.[7] .................................................. H01M 4/58
(52) U.S. Cl. .................. 429/231.95; 429/211; 429/163; 429/122
(58) Field of Search ........................ 429/231.95, 231.8, 429/231.9, 211, 212, 152, 153, 157, 163, 213

(56) References Cited

U.S. PATENT DOCUMENTS 4,740,431 A * 4/1988 Little ............................ 429/9
5,888,666 A * 3/1999 Kawakami .................... 429/62

* cited by examiner

Primary Examiner—Stephen Kalafut
Assistant Examiner—R Alejandro
(74) Attorney, Agent, or Firm—Harrison & Egbert

(57) ABSTRACT

An electricity storage device including an electrolyte film, a lithium graphite thin sheet, a composite polymer thin sheet, a positive collector, and a negative collector, which are all hermetically packaged in a housing. As the device is connected to an environment in which the voltage difference is relatively greater, the device is capable of storing the electricity. If the device is connected to an environment in which the voltage difference is relatively smaller, the stored electricity is released.

2 Claims, 3 Drawing Sheets

ELECTRICITY STORAGE DEVICE

BACKGROUND OF THE INVENTION

1. Field of the Invention

The present invention relates generally to an electrical device, and more particularly to an electricity storage device.

2. Description of Related Art

The conventional electricity storage devices are generally rather cumbersome and can not be easily assembled at a low cost. The demand for the electricity storage devices is on the increase for various applications.

BRIEF SUMMARY OF THE INVENTION

The primary objective of the present invention is to provide an electricity storage device which is small in volume and light in weight.

It is another objective of the present invention to provide an electricity storage device which can be easily assembled.

It is still another objective of the present invention to provide a cost-effective electricity storage device.

The features and the advantages of the present invention will be readily understood upon a thoughtful deliberation of the following detailed description of a preferred embodiment of the present invention with reference to the accompanying drawings.

DETAILED DESCRIPTION OF THE INVENTION

Figure 1:
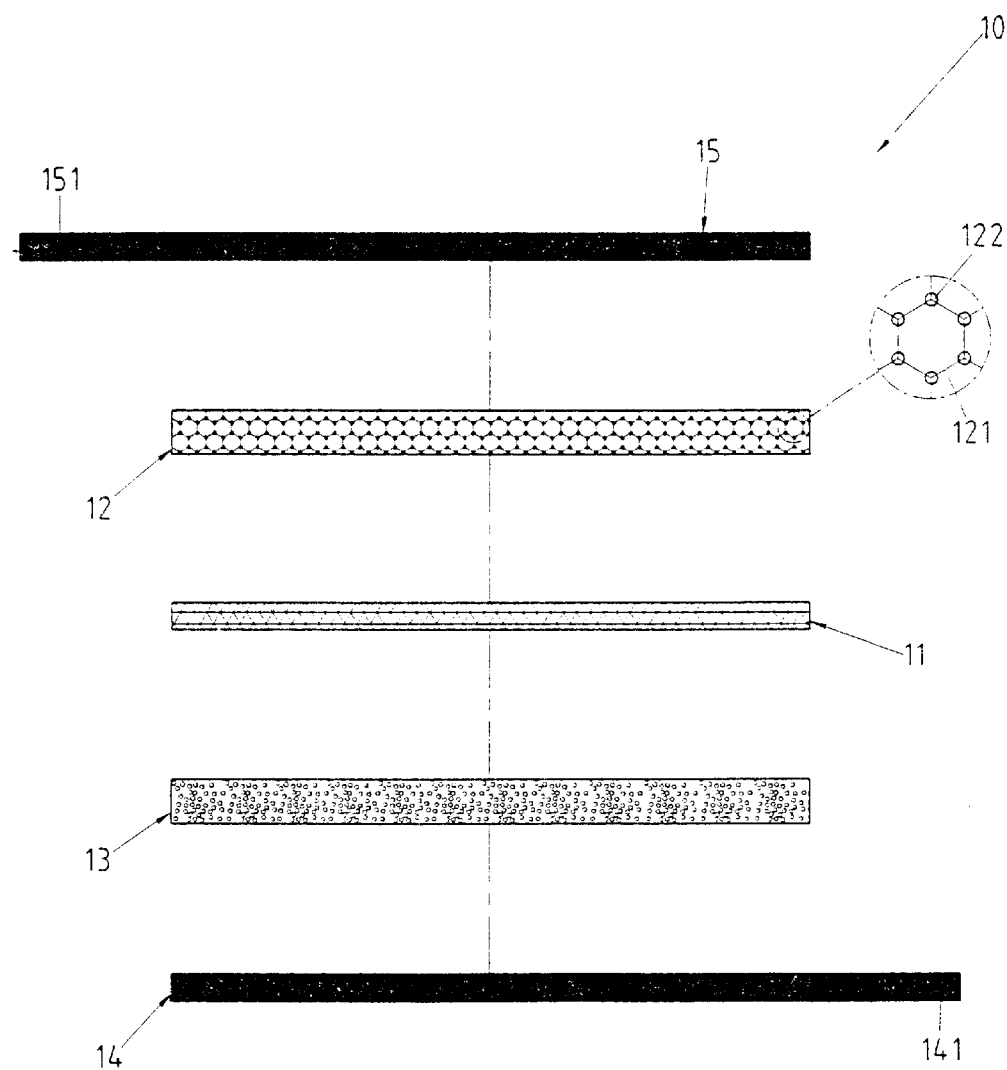
FIG. 1 shows an exploded view of the preferred embodiment of the present invention.
Figure 2:
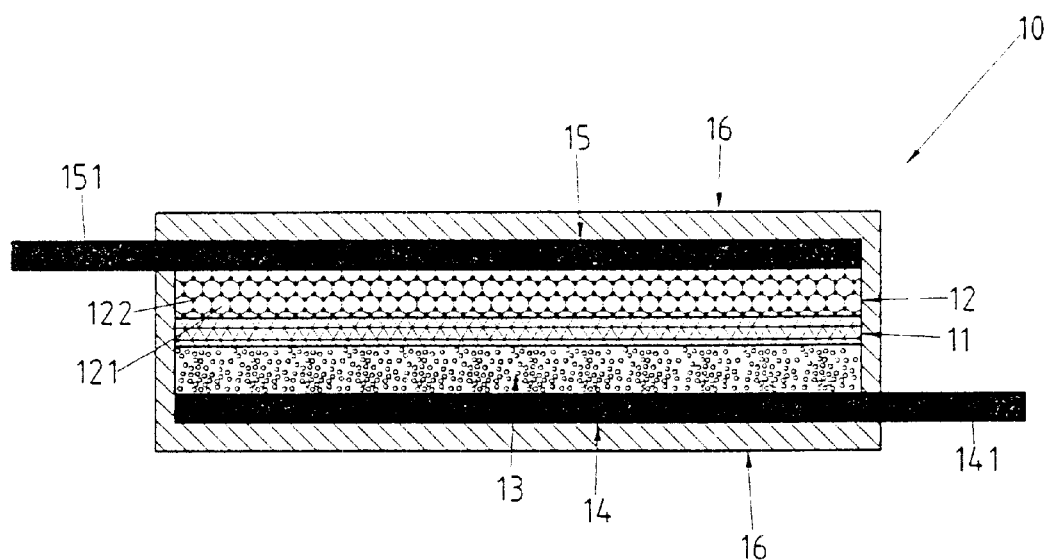
FIG. 2 shows a plan view of the preferred embodiment of the present invention.
Figure 3:
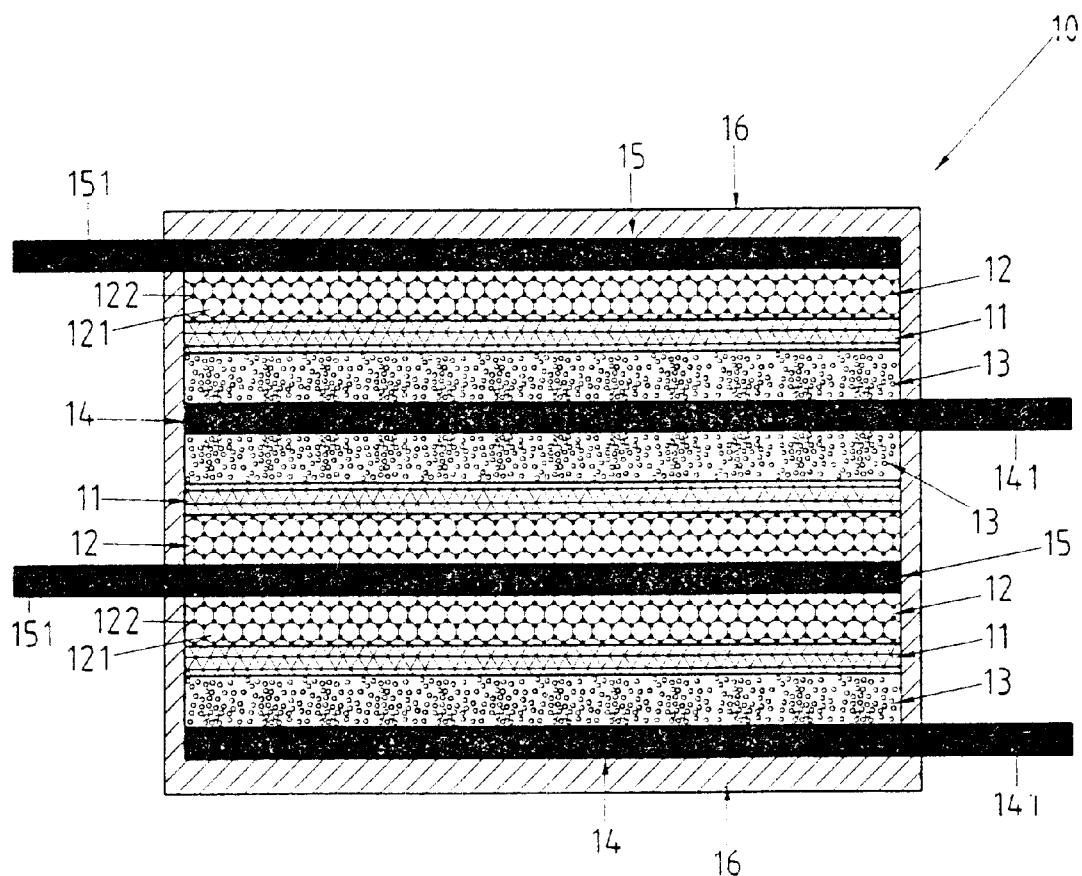
FIG. 3 shows another plan view of the preferred embodiment of the present invention.

As shown in FIGS. 1–3, an electricity storage device 10 of the preferred embodiment of the present invention comprises the component parts, which are described hereinafter.

An electrolyte film 11 is conductive to electricity.

A lithium graphite thin sheet 12 is attached to one longitudinal side of the electrolyte film 11 and is formed of a plurality of graphite particles 121 and lithium particles 122.

A composite polymer thin sheet 13 is conductive to electricity and is attached to the other longitudinal side of the electrolyte film 11.

A positive collector 14 is attached to the outer side of the composite polymer thin sheet 13 and is provided with a bonding point 141.

A negative collector 15 is attached to the outer side of the lithium graphite thin sheet 12 and is provided with a bonding point 151.

A housing 16 is made of an insulation material and is used to package hermetically the negative collector 15, the lithium graphite thin sheet 12, the electrolyte film 11, the composite polymer thin sheet 13, and the positive collector 14 such that the bonding points 141 and 151 of the positive collector 14 and the negative collector 15 of the housing 16.

As the electricity storage device 10 of the present invention is connected to an environment in which the voltage difference is relatively greater, the electricity storage device 10 is capable of storing the electricity. On the other hand, if the electricity storage device 10 of the present invention is connected to an environment in which the voltage difference is relatively smaller, the stored electricity is released.

As shown in FIG. 3, two or more electricity storage devices 10 of the present invention are hermetically packaged in a parallel manner in the housing 16 such that they share the common positive collector 14 or the negative collector 15.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

I claim:

1. An electricity storage device comprising:

an electrolyte film which conducts electricity;

a lithium graphite thin sheet directly attached to one longitudinal side of said electrolyte film, said lithium graphite thin sheet formed of a plurality of graphite particles and a plurality of lithium particles;

a composite polymer thin sheet which conducts electricity directly attached to another longitudinal side of said electrolyte film;

a positive collector attached to and extending along entirely a side of said composite polymer thin sheet opposite said electrolyte film, said positive collector having a bonding point extending outwardly beyond said side of said composite polymer thin sheet;

a negative collector attached to and extending along entirely a side of said lithium graphite thin sheet opposite said electrolyte film, said negative collector having a bonding point extending outwardly beyond said side of said lithium graphite thin sheet; and a housing formed of an insulative material, said housing hermetically containing said negative collector and said lithium graphite thin sheet and said electrolyte film and said composite polymer thin sheet and said positive collector, said bonding point of said positive collector and said bonding point of said negative collector each extending outwardly of said housing.

2. The device of claim 1, said negative collector, said lithium graphite thin sheet, said electrolyte film, said composite polymer thin sheet and said positive collector being arranged in parallel relation to each other in said housing.

* * * * *